United States Patent [19]
Kupersmith

[11] 3,903,767
[45] Sept. 9, 1975

[54] METHOD AND APPARATUS FOR CUTTING GLASS

[76] Inventor: Sam Kupersmith, 5305 Avenue D., Brooklyn, N.Y. 11203

[22] Filed: Jan. 23, 1975

[21] Appl. No.: 543,419

[52] U.S. Cl. .......................... 83/7; 83/468; 83/522; 83/614
[51] Int. Cl.² ......................................... C03B 33/02
[58] Field of Search ............ 83/7, 6, 455, 468, 522, 83/614; 225/2, 96, 96.5; 33/32 C

[56] References Cited
UNITED STATES PATENTS
| | | | |
|---|---|---|---|
| 1,710,898 | 4/1929 | Rowley | 83/614 X |
| 2,243,778 | 5/1941 | Stansel | 83/614 X |

*Primary Examiner*—Frank T. Yost
*Attorney, Agent, or Firm*—Darby & Darby

[57] ABSTRACT

A carriage assembly is slidably and rotatably mounted on a cylindrical bar supported above a horizontal surface upon which the glass to be cut is supported. A straight edge is mounted on the horizontal surface perpendicular to the bar. A level is mounted on the carriage assembly and a set screw is provided to lock the levelled carriage assembly against the bar. A standard glass cutter tool is removably attached to the carriage assembly.

First, the carriage assembly is levelled. Next, the carriage assembly is locked in place against the bar. Next, a standard glass cutter tool is positioned in the carriage assembly and locked in place. Next, the carriage assembly is unlocked so that it is slidable along the bar.

11 Claims, 3 Drawing Figures

PATENTED SEP 9 1975 3,903,767

METHOD AND APPARATUS FOR CUTTING GLASS

BACKGROUND OF THE INVENTION

This invention generally relates to a method and apparatus for the precision cutting of glass.

There exists a variety of situations in which it is necessary to cut a plate of glass to a precise dimension. Apparatus heretofore available to accomplish this result is bulky, expensive to manufacture and requires a certain degree of skill to operate.

SUMMARY OF THE INVENTION

The present invention provides glass-cutting apparatus which is of simple construction, inexpensive to manufacture, which requires no skill to operate and which is portable.

Briefly stated, the glass-cutting apparatus of this invention consists of a horizontal surface upon which the glass to be cut is supported, a horizontally extending bar supported above the horizontal surface, and a carriage assembly slidably and rotatably mounted on the horizontally extending bar. The carriage assembly includes a standard glass-cutter tool mounted on the carriage assembly and means to level the carriage assembly. In operation, the carriage assembly is first levelled and then locked in place on the bar. Then, the cutter tool is positioned in the carriage assembly so that the cutter wheel is supported by the glass to be cut. Then the cutter tool is locked in place in the carriage assembly and the carriage assembly is unlocked so that it is slidable along the bar.

Structural features of the invention and the complete nature thereof will become increasingly apparent following a consideration of the ensuing specification and the appended claims in which the invention is defined, particularly when taken in conjunction with the accompanying illustrative drawings setting forth a preferred embodiment of the invention.

DESCRIPTION OF A PREFERRED EMBODIMENT

Figure 1:
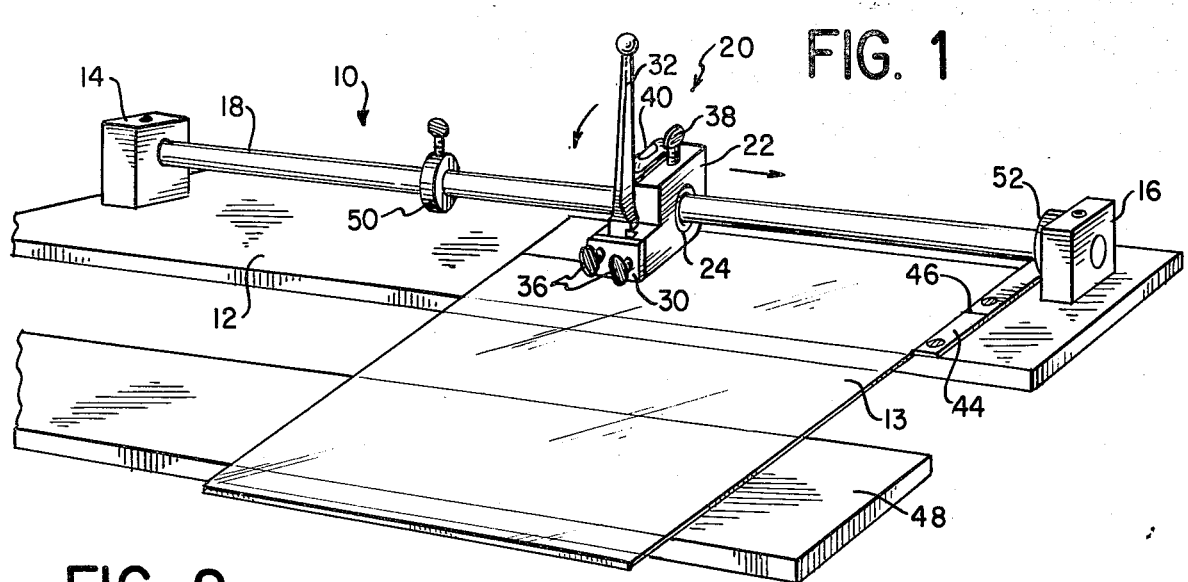
FIG. 1 is a perspective view of the glass-cutting apparatus of this invention.
Figure 2:
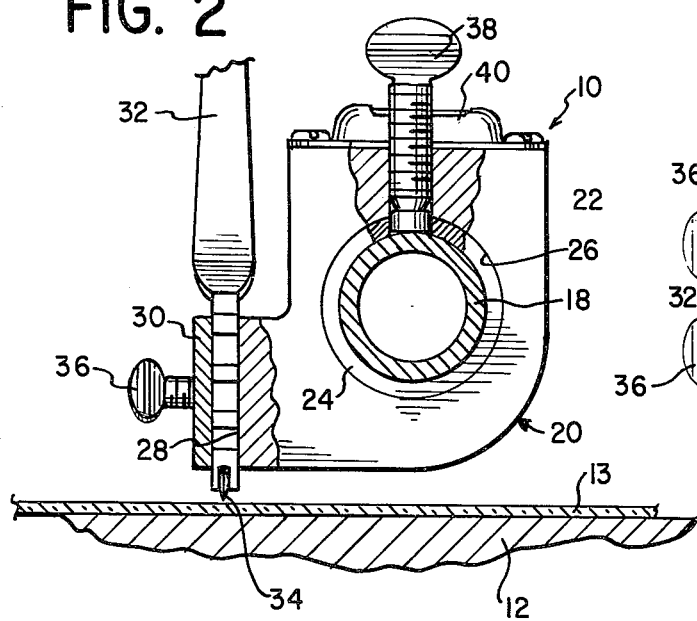
FIG. 2 is a transverse view of the carriage assembly with parts broken away.

Referring to FIG. 1, the glass-cutting apparatus 10 of this invention includes a horizontal surface 12 which supports the glass plate 13 which is to be cut. Blocks 14 and 16 are mounted at each end of the horizontal surface 12. Horizontally extending bar 18 is rigidly supported at each of its ends by blocks 14 and 16.

Carriage assembly 20 which is rotatably and slidably mounted on horizontal bar 18 consists of a generally L-shaped member 22 having an annular recess 26 within which is positioned a bushing 24. The horizontal bar 18 may be composed of tubular steel and the bushing 24 may be composed of bronze.

Figure 3:
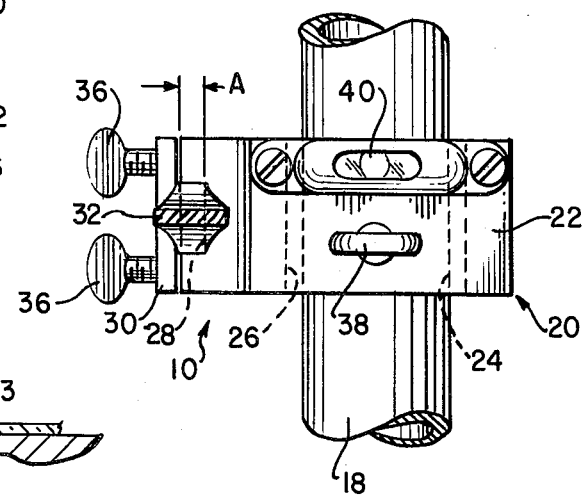
FIG. 3 is a plan view of the carriage assembly with parts broken away.

On the horizontally extending portion of the L-shaped member 22, a vertically extending, open channel 28 is formed. The channel 28 is adapted to receive a standard glass-cutter tool which is readily available in hardware stores such as the type manufactured by Red Devil Co. The depth (marked A in FIG. 3) of the channel 28 is less than the depth of the cutting tool, and the width of the channel 28 is approximately the same as the width of the head of the cutter tool 32.

A plate 30 is adapted to be fastened to the vertical surface of the horizontally extending portion of the L-shaped member 22 across the open channel 28 in order to lock the cutter tool 32 in place. This can be accomplished by fastening the plate 30 to the carriage assembly by set screws 36.

A set screw 38 is provided on the top surface of the L-shaped member 22 in order to lock the carriage assembly in place against the horizontally extending bar 18 and prevent the carriage assembly from rotating or sliding on the bar 18. When the set screw 38 is loosened, L-shaped member 22 is free to slide and rotate on the bar.

A level 40 is attached to the top surface of the L-shaped member 22 by screws or any other suitable fastening means. The purpose of the level is explained in detail below.

A straight edge 44 is mounted transverse of the horizontal surface 12. A line 46 is inscribed on the straight edge. The straight edge 44 is positioned perpendicular to the longitudinal axis of the horizontal bar 18 and, therefore, to the path of travel of the carriage assembly.

An auxiliary horizontal member 48 is provided to support long pieces of glass.

An adjustable collar 50 is provided on the bar 18 to act as a stop. A permanent collar 52 is mounted on the bar 18 to stop the cutter tool 32 before the cutter tool wheel 34 cuts into the straight edge 44.

In operation, the glass-cutting apparatus of this invention works in the following manner. The glass 13 to be cut is placed on the horizontal surfaces 12 and 48 and a straight edge of the glass pane is aligned with the straight edge 44. The glass to be cut is measured and the precise location at which the glass to be cut is aligned with line 46 on the straight edge 44. Then, with the carriage assembly 20 positioned above the glass to be cut, the carriage assembly set screw 38 is loosened and the carriage assembly is rotatably adjusted until the bubble in the level 40 is on center. Then, the carriage assembly set screw 38 is tightened. Then, the pressure plate 30 is loosened and a cutter tool 32 is positioned within open channel 28. Since the cutter tool is only being guided by channel 28, the cutter tool wheel 34 contacts the plate of glass 13 to be cut. Then, the pressure plate set screws 36 are tightened so that pressure plate 30 locks the cutter tool in place. Then, the carriage assembly set screw 38 is loosened so that the carriage 20 slides easily on bar 18. Then, the carriage 20 is drawn along the bar 18 with even pressure being applied on the carriage so that the wheel of the cutter tool scores the glass to be cut. The carriage is advanced until it reaches the stop collar 52. The glass to be cut should be held on the horizontal member 12 to prevent it from being moved during the cutting operation. The scored glass can be broken off by aligning the score line on the glass with an edge of the horizontal surface and tapping the glass.

It is, of course, not necessary that the glass be positioned in place when the carriage assembly level adjustment is taking place. The glass need only be placed on the horizontal surface 12 when the position of the cutter tool in the carriage is being adjusted.

The purpose of adjusting the carriage so that is is level before locking the cutting tool in place is to insure that the wheel 34 of the cutter tool is precisely aligned with the line 46 inscribed on the straight edge 44. This is necessary because the glass-cutting apparatus of this invention can be used to cut glass of different thicknesses. Since the carriage 20 is rotatable about the bar 18, an adjustment must be made each time a different thickness glass is to be cut.

Other means of levelling the carriage 20 can also be used. For example, a portion of the bar 18 can be filed flat. When the carriage is placed over this flat portion of the bar 18 and the set screw 38 is tightened, the carriage will automatically be level. Then the cutter tool adjustment can be made. Any other suitable means of levelling the carriage assembly prior to adjustment of the cutter tool could be used.

Instead of a standard glass cutter with a cutting wheel, a glass cutter with a diamond tip or other cutting edge may be used in the glass-cutting apparatus of this invention.

It is conceivable that upon examining the foregoing disclosure, those skilled in the art may devise embodiments of the concept involved which differ somewhat from the embodiment shown and described herein, or may make various changes in structural details in the present embodiment. Consequently, all such changed embodiments or variations in structure as utilize the concepts of the invention and clearly incorporate the spirit thereof are to be considered as within the scope of the claims appended below.

What is claimed is:

1. Apparatus for cutting a plate of glass with a cutter tool having a cutting edge comprising:
    a horizontal surface for supporting a plate of glass;
    a horizontally extending cylindrical bar being supported above said horizontal surface;
    a carriage assembly including a block being slidably and rotatably mounted on said bar, means for loosely holding and for locking a cutting tool in said block, means for levelling the position of said block with respect to said bar and means for locking said block in said levelled position to prevent said block from sliding and rotating movement with respect to said bar.

2. The apparatus recited in claim 1, said tool-holding and locking means comprising a vertically extending channel being formed in said block, and a plate mounted on said block and positioned across said channel, said plate being movable toward and away from said block.

3. The apparatus recited in claim 2, further comprising a straight edge member mounted on said horizontal surface perpendicular to the longitudinal axis of said bar, said straight edge member having a measuring line engraved thereon.

4. The apparatus recited in claim 3, said engraving line being aligned with the cutter tool edge.

5. The apparatus recited in claim 1, said levelling means comprising a level mounted on said block.

6. The apparatus recited in claim 1, said levelling means comprising said cylindrical bar having a flattened, horizontal portion.

7. The apparatus recited in claim 1, said bar-locking means comprising a set screw being threaded through said block in order to engage said bar.

8. Apparatus for cutting a plate of glass with a glass cutter tool having a cutter edge comprising:
    a longitudinally extending horizontal surface for supporting the plate of glass;
    a horizontally extending cylindrical bar being supported above said horizontal surface;
    a carriage assembly being slidably and rotatably mounted on said bar, said carriage assembly including a generally L-shaped block, a vertically extending open channel being formed in the horizontally extending portion of said block, a plate being mounted on said block and being movable towards and away from said block, said plate extending across the open portion of said channel, a glass cutter tool being positioned in said channel, means for levelling the position of said L-shaped block with respect to said bar and means for locking said L-shaped block to said bar to prevent sliding and rotating movement of said block with respect to said bar.

9. The apparatus recited in claim 8, further comprising a straight edge member mounted on said horizontal surface and being positioned perpendicular to the longitudinal axis of said bar, said straight edge member having a measuring line engraved thereon, said measuring line being aligned with the cutter tool edge in said block.

10. Apparatus for cutting a plate of glass with a glass cutter tool having a cutter edge comprising:
    a longitudinally extending horizontal surface for supporting the plate of glass;
    a horizontally extending cylindrical bar being supported above said horizontal surface;
    a straight edge member mounted on said horizontal surface and being positioned perpendicular to the longitudinal axis of said bar, said straight edge member having a measuring line engraved thereon;
    a carriage assembly being slidably and rotatably mounted on said bar, said carriage assembly including means for levelling the position of said carriage assembly on said bar and means for locking said carriage assembly in said levelled position, and means for loosely holding a cutter tool so that the cutting edge rests on the plate of glass to be cut and means for locking the loosely held cutter tool to the levelled carriage assembly.

11. A method of cutting a plate of glass with a cutter tool having a cutter edge which is removably mounted on a carriage assembly which is slidably and rotatably mounted on a horizontal bar which is supported above a horizontal surface upon which the glass to be cut is supported comprising the steps of:
    levelling the carriage assembly with respect to the bar;
    locking the levelled carriage assembly in place to prevent movement of the carriage assembly with respect to the bar;
    positioning a glass cutter tool in the carriage assembly so that the cutter edge contacts the glass to be cut;
    locking the cutter tool to the carriage assembly to prevent movement of the cutter tool with respect to the carriage assembly; and
    unlocking the carriage assembly to permit sliding and rotating movement of the carriage assembly with respect to the bar.

* * * * *